United States Patent [19]

Dorawala et al.

[11] 3,957,682
[45] May 18, 1976

[54] PREPARATION OF METHANE, HYDROGEN AND CARBON MONOXIDE CONTAINING GASES

[75] Inventors: Tansukhlal G. Dorawala; John H. Estes; Edwin R. Kerr, all of Wappingers Falls, N.Y.

[73] Assignee: Texaco Inc., New York, N.Y.

[22] Filed: Dec. 14, 1973

[21] Appl. No.: 424,979

[52] U.S. Cl. .............................. 252/373; 48/214 A
[51] Int. Cl.² .............................................. C01B 2/16
[58] Field of Search ................... 48/214, 197 R, 211; 252/373, 470; 260/676 R, 449 M

[56] References Cited
UNITED STATES PATENTS

| | | | |
|---|---|---|---|
| 943,627 | 12/1909 | Elworthy | 260/449 M |
| 1,621,652 | 3/1927 | Bean | 48/214 |
| 1,673,032 | 6/1928 | Williams | 252/470 |
| 1,846,235 | 2/1932 | Wade | 48/214 |
| 1,902,004 | 3/1933 | Whitlock | 48/214 |
| 2,029,657 | 2/1936 | Frey et al. | 48/214 |
| 2,465,666 | 3/1949 | Stark | 48/214 |
| 2,662,003 | 12/1953 | Wappill et al. | 48/214 |
| 3,334,055 | 8/1967 | Dowden et al. | 48/214 |
| 3,388,074 | 6/1968 | Reitmeier | 252/470 |
| 3,396,124 | 8/1968 | Taylor et al. | 48/214 |
| 3,453,146 | 7/1969 | Bawa et al. | 48/214 |
| 3,475,510 | 10/1969 | Newman et al. | 252/373 |
| 3,574,578 | 4/1971 | Franz et al. | 48/197 |

OTHER PUBLICATIONS

"Chemical Technology", Barnes and Noble, Vol. 3, pp. 839 and 840.

*Primary Examiner*—S. Leon Bashore
*Assistant Examiner*—Peter F. Kratz
*Attorney, Agent, or Firm*—T. H. Whaley; C. G. Ries; Carl G. Seutter

[57] ABSTRACT

Methane containing gas is prepared by passing steam and a non-aromatic hydrocarbon into contact with activated metal screen catalyst, such as inconel metal, at about 700°F–1100°F and 300–800 psig.

20 Claims, No Drawings

PREPARATION OF METHANE, HYDROGEN AND CARBON MONOXIDE CONTAINING GASES

FIELD OF THE INVENTION

This invention relates to the treatment of hydrocarbons. More particularly, it relates to the preparation of methane in the presence of a rugged catalyst.

BACKGROUND OF THE INVENTION

As is well known to those skilled in the art, hydrocarbon feedstocks, typically those boiling up to about 600°F. (such as naphtha) may be converted to methane by reaction with steam in the presence of catalyst. Typically the products of such a reaction may include methane, hydrogen, carbon monoxide, and carbon dioxide.

The catalysts which may be commonly employed include zeolites or amorphous inorganic oxides such as silica, alumina, magnesia, zirconia, etc. The typical supported catalyst degrades in the presence of the reactants during the extended periods of reaction; and this factor limits the conditions under which reaction may be carried out in order to permit attainment of reasonable catalyst life.

It is an object of this invention to provide a process for preparation of methane. Other objects will be apparent to those skilled-in-the-art.

STATEMENT OF THE INVENTION

In accordance with certain of its aspects, the novel method of this invention for preparing methane may comprise passing a mixture of steam and a non-aromatic hydrocarbon into contact with an activated catalyst consisting essentially of a massive metal screen containing at least about 50% nickel;

maintaining said mixture of steam and non-aromatic hydrocarbon at about 700°F–1100°F and 300–800 psig during said contact with catalyst thereby forming a product gas containing methane;

maintaining the mole ratio of steam to hydrocarbon at 5–20:1; and recovering said product gas containing methane.

DESCRIPTION OF THE INVENTION

In accordance with certain of its aspects, the non-aromatic charge hydrocarbon may preferably be an aliphatic hydrocarbon, either pure or in admixture, typically having a boiling point of 176°F–1292°F (80°C–700°C). Light paraffinic streams may be employed. Typical of such streams are those containing predominantly lower paraffins including butanes, pentanes, etc.; and illustrative of such streams are light straight run products, various condensates, and raffinates from which aromatics have been extracted.

Although the charge may be a pure $C_4$ or $C_5$ paraffin, it more commonly may be a mixture containing $C_4$ to $C_8$ paraffins. The paraffin content may be 60%–100%, preferably 70%–85%, say about 80%. The charge may also contain naphthenes in amount of 5%–20%, preferably 5%–10%, say 8% and other components such as alkylbenzenes in amount of 5%–15%, say 12%. Lesser amounts of other components may be present including aromatics, etc.

A typical charge stream may be a heavy Udex raffinate (from which the aromatics have been extracted) having the following composition:

| Udex Raffinate | | |
|---|---|---|
| | % by Volume | |
| Component | Broad | Typical |
| Paraffins | 70–85 | 80.7% |
| Naphthenes | 5–20 | 7.8 |
| Alkylbenzenes | 5–15 | 11.5 |
| | | 100.0 |

This raffinate may have an IBP of 190°F, an EP of 275°F, and an API gravity of 70.1.

Another typical charge stream may be a light straight run distillate (obtained from debutanization of a straight run gasoline) having the following composition:

| Light Straight Run Distillate | | |
|---|---|---|
| | % by Volume | |
| Component | Broad | Typical |
| Paraffins | 80–99 | 94.0 |
| Naphthenes | 0–8 | 3.0 |
| Aromatics | 0–15 | 3.0 |

This distillate may be an IBP of 92°F, an EP of 300°F, and an API gravity of 79.2.

Particularly desirable results may be achieved by use, as the hydrocarbon charge, of a non-aromatic composition containing substantial proportions of paraffinic and/or naphthenic hydrocarbons and lesser proportions of aromatic hydrocarbons. Presence of up to about 15%–20% aromatics may be tolerated — although large proportions of aromatics will be undersirable. The preferred charge is a raffinate from which aromatics have been extracted; use of such a charge permits reforming to be carried out most economically with maximum yield of methane and decreased yield of undersired by-products which might be present if the charge contains substantial quantities of aromatics.

Preparation of methane in practice of the method of this invention may be carried out by passing the nonaromatic hydrocarbon charge to the reaction zone wherein it is maintained at 700°F–1100°F, preferably 900°–1100°F, say 1100°F and pressure of 300–800 psig, preferably 300–700 psig, say 500 psig.

Preferably there is admitted to the reaction zone steam in an amount (per mole of hydrocarbon charge) of 5–20, preferably 5–15, say 10 moles.

Thus in one preferred embodiment, the reaction may be carried out at 1100°F and 500 psig with a steam to hydrocarbon mole ratio of about 10.

It is a feature of the novel process of this invention that it be carried out in the presence of a catalyst consisting essentially of a metal screen containing at least about 50% nickel. Although it may be possible to use a screen containing 95%–100% nickel, it is found that such catalysts are undesirably characterized by an activation time which is substantially longer than that of the preferred catalysts containing 50%–90% nickel — by a substantial time factor e.g. 40 hours for pure nickel versus 16 hours for inconel metal containing 76% nickel. It is also found that the use of catalyst containing more than 95% nickel yields a system which takes 200% –1800% longer to come on stream (i.e. to reach equilibrium); and the yield of methane may be 10%–40% less than that obtained with the preferred catalyst. The preferred catalyst is also found to be more temperature stable i.e. to maintain its physical integrity and operability for 10%–50%, say 20% longer than the less preferred catalyst. For these reasons, the preferred catalyst may consist essentially of a metal screen containing 50%–95% nickel. Typical of the preferred metals which may be employed may be those having the composition set forth in the following table:

TABLE

| Alloy | Ni | C    | Si   | S      | Mn   | Fe   | Cu   | Cr   |
|-------|----|------|------|--------|------|------|------|------|
| 1     | 80 |      |      |        |      |      |      | 20   |
| 2     | 80 |      |      |        |      |      |      | 20   |
| 3     | 60 | 0.5  |      |        | 1.75 | 10   |      |      |
| 4     | 73 |      |      |        | 0.2  | 6.5  |      |      |
| 5     | 75 |      |      |        | 2    | 12   |      | 11   |
| 6     | 61 |      |      |        |      | 23   |      | 16   |
| 7     | 60 | 0.1  |      |        |      | 24   | 16   |      |
| 8     | 76 | 0.04 | 0.20 | 0.0075 |      | 7.2  | 0.10 | 15.8 |

The preferred metal may be one containing at least 50% nickel, preferably 50%–95%, more preferably about 60%–90%, more preferably one containing at least about 75% nickel. A more preferred metal may be one containing at least about 75% nickel, 10%–20%, say about 16% chromium, and about 5%–15%, say about 7% iron and lesser amounts of other components. The preferred metal may be a nickel-chromium alloy such as that sold as Inconel 600 containing about 76% nickel, 15.8% chromium, 7.2% iron, 0.20% silicon, 0.10% copper, 0.04% carbon, and 0.007% sulfur.

Although a spool of wound wire or crushed wire may be employed as the massive metal screen catalyst, it is preferred to use a metal screen which is made of a woven wire mesh. Typically the wire mesh may be made of wire having diameter of 0.003 to 0.182 mm preferably 0.0045–0.018 mm, say 0.05 mm.

The preferred catalyst may be mesh made of Inconel 600 metal; and the woven metal screen or wire mesh may be rolled into a cylindrical roll in manner so that typically 60–90 grams may occupy 100 cc of reaction volume. This may provide a surface area of 2–100 $cm^2/g$, typically 10–40, say 17 $cm^2$ per gram of catalyst.

In practice of the process of this invention, the hydrocarbon charge may be passed into contact with the catalyst at a volume hourly space velocity VHSV of 0.01–1.0, preferably 0.05–0.30, say 0.08.

It is a feature of the proceses of this invention that the catalyst be activated prior to use; and preferably this is carried out by heating to 700°F–1400°F, say 800°F at 0–400 psig, say 200 psig for at least 4 hours, say 4–30 hours, say 18 hours in the presence of an oxygen-containing gas, typically air, at a space velocity VHSV of 50–1000, say 300, (when the methane yield drops to an unacceptable level the catalyst may be reactivated or regenerated by a comparable process).

It may be found that most efficient operation can be achieved if the system be started up by a series of steps as follows:

a. activation as noted supra;

b. passing hydrocarbon charge and steam through the bed at temperatures of 1200°F–1400°F, say 1250°F pressure of 0–300 psig, say 200 psig, and mole ratio of 15–70, say 35 for 4 to 20 hours, say 10 hours until the catalyst has reached equilibrium for steam reforming to produce hydrogen;

c. then decreasing the temperature, increasing the pressure, and decreasing the ratio to methane production conditions (e.g. 700°F–1100°F., e.g. 1100°F; 300–800 psig, say 500 psig, and mole ratio of 5–20, say 10) thereby producing methane.

Alternatively if the catalyst does not reach full activity due to presence of trace amounts of poisons, activation may be effected by (a) maintaining the catalyst at 1200°–1400°F for 0.5–6 hours in the presence of charge hydrocarbon without steam (b) introducing steam into the flowing charge hydrocarbon, and (c) adjusting the temperature to desired operating pressure. If the yield is below desired levels, this procedure may be repeated.

During practice of the process of this invention, charge hydrocarbons may be converted to methane. Typical product streams may contain 20%–50%, preferably 30%–45%, say 45% methane, 20%–30%, preferably 25%–30%, say 30% hydrogen, 10%–25%, preferably 10%–20%, say 17.5% carbon dioxide, 0%–5%, preferably 1% –3%, say 2.5% carbon monoxide, and 0–30%, preferably 1%–10%, say 5.0% of lower hydrocarbons other than methane.

It is a feature of this invention that use of the metal catalyst, containing about 50%–95% mickel in the preferred embodiment, permits attainment of outstanding results in terms of methane production. It is also a feature of these preferred catalysts that they permit attainment of substantially greater yields of methane than may be obtained by the use of alloys containing lesser quantities of (or no) nickel on the one hand or of metal catalysts containing 95%–100% nickel on the other hand.

DESCRIPTION OF PREFERRED EMBODIMENT

Practice of the process of this invention will be apparent to those skilled in the art from the following illustrative embodiments wherein, as elsewhere in this description, all parts are parts by weight unless otherwise specifically stated.

In the Examples, a sulfolane raffinate was processed having the following properties:

| Component   | Vol.% |
|-------------|-------|
| Paraffins   | 96    |
| Unsaturates | 2     |
| Naphthenes  | —     |
| Aromatics   | 2     |
| IBP °F.     | 95    |
| EP °F.      | 320   |

In each Example, the raffinate together with steam was passed through the reactor at space velocities, temperature °F, pressure psig, and mole ratio (of steam to raffinate) as shown in the Table which follows.

Prior to each run the reactor contents (including catalyst) are activated by heating in air (300 VHSV) at 800°F and 200 psig for about 18 hours.

The reactor contained as catalyst the following:

Examples I-XII

A roll of 11 mil Inconel 600 wire mesh possessing a surface area of about 17 square centimeters per gram was rolled into a cylindrical roll and fitted into approximately 200 cc reactor volume.

Examples XIII-XVIII

In these examples, the catalyst is 11 mil nickel wire, possessing a surface area of about 17 square cm per gram, rolled into a cylinder and fitted into approximately 200 cc reactor volume.

Example XIX

In this example, the reactor contained no metal mesh catalyst.

Examples XX–XXI

In these examples, the reactor contained about 11 mil wire mesh (stainless steel 304) possessing a surface area of about 17 square cm per gram, rolled into a cylinder and fitted into approximately 200 cc reactor volume. (304 stainless steel contains 0.08% max carbon, 2% Mn max, 0.045% max P, 0.030% S max, 1.00% max Si, 18%–20% Cr, and 8%–12% Ni).

In each Example the raffinate in gas phase and the steam are passed through the reactor. The composition of the product gas is determined in volume %. The yield of methane and hydrogen are determined in SCFB.

TABLE

| Example | XIII* | XIV* |
|---|---|---|
| Temperature °F | 1195 | 1216 |
| Pressure, psig | 200 | 215 |
| Steam/Raff. Mole Ratio | 40 | 40 |
| Raff. Conv. Mole % Chg | 100 | 76 |
| $H_2$ yield SCFB | 1584 | 7685 |
| $CH_4$ yield SCFB | 966 | 1455 |
| Raffinate VHSV | .125 | .177 |
| GAS COMPOSITION VOL. % | | |
| $H_2$ | 37.7 | 60.1 |
| $CH_4$ | 23.0 | 11.4 |
| CO | 0.9 | 3.7 |
| $CO_2$ | 13.3 | 18.7 |
| Hydrocarbons $C_2$–$C_4$ | 25.2 | 6.0 |
| Weight of Catalyst g.⁴ | 144 | 144 |

*Control

TABLE

| Example | XV* | XVI* | XVII* | XVIII | XIX* | XX* | XXI* |
|---|---|---|---|---|---|---|---|
| Temperature °F | 1216 | 1203 | 1200 | 953 | 956 | 1202 | 1001 |
| Pressure, psig | 200 | 200 | 212 | 500 | 500 | 200 | 200 |
| Steam/Raff Mole ratio | 41 | 39 | 59 | 12 | 8 | 9 | 9 |
| Raff. Conv. Mole % Chg | 100 | 100 | 100 | 84 | 35 | 79 | 62 |
| $H_2$ yield SCFB | 9439 | 11599 | 14247 | 3417 | 170 | 214 | 129 |
| $CH_4$ yield SCFB | 1515 | 1071 | 1344 | 3909 | 905 | 1365 | 858 |
| Raffinate VHSV | .130 | .117 | .115 | .142 | .120 | .170 | .125 |
| GAS COMPOSITION VOL % | | | | | | | |
| $H_2$ | 59.4 | 68.5 | 69.21 | 31.3 | 5.3 | 10.0 | 7.7 |
| $CH_4$ | 8.3 | 6.7 | 6.5 | 35.8 | 28.1 | 63.6 | 51.7 |
| CO | 5.4 | 4.1 | 3.6 | 3.8 | — | — | — |
| $CO_2$ | 26.7 | 19.6 | 20.3 | 24.9 | 3.5 | 0.6 | 0.6 |
| Hydrocarbons $C_2$–$C_4$ | 0.3 | 1.1 | 0.4 | 4.2 | 63.1 | 25.8 | 39.9 |
| Weight of Catalyst g. | 144 | 144 | 144 | 144 | 0 | 148 | 148 |

*Control

From the above tables, it will be apparent that the novel invention permits attainment of product gas con-

TABLE

| Example | I* | II* | III* | IV* | V | VI |
|---|---|---|---|---|---|---|
| Raffinate VHSV | 0.06 | 0.115 | 0.105 | 0.125 | 0.130 | 0.115 |
| Temperature, °F | 1205 | 1205 | 1205 | 1202 | 997 | 997 |
| Pressure psig | 100 | 200 | 200 | 200 | 300 | 500 |
| Steam/Raff. mole ratio | 67 | 35 | 38 | 8 | 9 | 9 |
| Raff. Conv. Mole % Chg | 87 | 94 | 93 | 100 | 100 | 100 |
| $H_2$ yield SCFB | 16572 | 13018 | 13276 | 5942 | 1516 | 2524 |
| $CH_4$ yield SCFB | 548 | 1498 | 1607 | 2285 | 2227 | 1969 |
| GAS COMPOSITION VOL %. | | | | | | |
| $H_2$ | 72.7 | 67.0 | 65.7 | 54.6 | 25.5 | 39.8 |
| $CH_4$ | 2.4 | 7.7 | 8.0 | 21.0 | 34.2 | 31.0 |
| CO | 3.3 | 4.7 | 5.4 | 13.8 | — | — |
| $CO_2$ | 21.6 | 20.3 | 20.8 | 10.6 | 23.4 | 17.9 |
| Hydrocarbons $C_2$—$C_4$ | — | 0.2 | 0.1 | — | 16.9 | 11.2 |
| Weight of Catalyst g.⁴ | | 144 | 144 | 160 | 159 | 159 |

*Control

TABLE

| Example | VII | VIII* | IX | X | XI | XII |
|---|---|---|---|---|---|---|
| Raffinate VHSV | 0.115 | 0.075 | 0.072 | 0.063 | 0.078 | 0.075 |
| Temperature, °F | 1002 | 1198 | 1095 | 1095 | 1091 | 1095 |
| Pressure psig | 700 | 200 | 300 | 300 | 300 | 500 |
| Steam/Raff. mole ratio | 9 | 19 | 5 | 5 | 5 | 5 |
| Raff. Conv. Mol % Chg | 100 | 100 | 100 | 100 | 100 | 100 |
| $H_2$ yield SCFB | 1886 | 9967 | 2695 | 4202 | 2295 | 2248 |
| $CH_4$ yield SCFB | 2060 | 1206 | 2272 | 4269 | 3016 | 2955 |
| GAS COMPOSITION VOL %. | | | | | | |
| $H_2$ | 32.2 | 66.7 | 42.2 | 38.9 | 32.3 | 32.3 |
| $CH_4$ | 35.1 | 8.1 | 35.6 | 39.5 | 42.5 | 42.5 |
| CO | — | 7.0 | 2.2 | 2.6 | 2.5 | 2.5 |
| $CO_2$ | 17.1 | 17.4 | 16.8 | 16.9 | 17.6 | 17.6 |
| Hydrocarbons $C_2$–$C_4$ | 15.1 | 0.9 | 2.7 | 7.1 | 5.0 | 5.0 |
| Weight of Catalyst g.⁴ | 159 | 152 | 152 | 152 | 152 | 152 |

*Control tainment desired methane. For example comparison of Control Examples I–IV and VIII with comparable experimental Examples V–VII and IX–XII, shows that the novel process permits attainment of 1969–3016 SCFB of product gases containing 3.10%–42.5% methane while the control examples give 548–2285 SCFB of product gases containing only 2.4%–21% methane.

Examples XIII–XVIII

It is apparent that Control Examples XIII–XVII yield 966–1455 SCFB of gas containing 6.5%–23.0% methane whereas comparable Experimental Example XVIII gives 3909 SCFB of a product gas containing 35.8% methane.

Example XIX

In this Control Example, the product was only 905 SCFB in a gas containing 28.1%. The product is also undesirable in that it contains 63.1% of $C_2$–$C_4$ hydrocarbons.

Examples XX–XXI

In these Control Examples, the charge is converted to methane in amount of 858–1365 SCFB, the product gas containing 51.7%–63.0% methane. However these runs are undersirable in that they contain undersirably large proportions (25.8%–39.9%) of $C_2$–$C_4$ hydrocarbons.

Although this invention has been illustrated by reference to specific embodiments, it will be apparent to those skilled in the art that various changes and modifications may be made which clearly fall within the scope of this invention.

We claim:

1. The method of preparing methane which comprises passing a mixture of steam and a non-aromatic charge hydrocarbon into contact with an activated catalyst consisting essentially of a massive metal screen containing at least about 50% nickel, said activated catalyst having been activated by heating in the presence of an oxygen-containing gas;

maintaining said mixture of steam and charge non-aromatic hydrocarbon at temperature of about 700°F–1100°F and pressure of 300–800 psig during said contact with catalyst thereby converting said non-aromatic charge hydrocarbon to a product gas containing methane;

maintaining the mole ratio of steam to charge hydrocarbon at 5–20:1; and recovering said product gas containing methane.

2. The method of preparing methane as claimed in claim 1 wherein said non-aromatic charge hydrocarbon comprises aliphatic hydrocarbons.

3. The method of preparing methane as claimed in claim 1 wherein said non-aromatic charge hydrocarbon consists essentially of aliphatic hydrocarbons.

4. The method of preparing methane as claimed in claim 1 wherein said non-aromatic charge hydrocarbon comprises an aliphatic raffinate.

5. The method of preparing methane as claimed in claim 1 wherein said activation includes heating said massive metal at 700°F.–1400°F. in the presence of an oxygen-containing gas.

6. The method of preparing methane as claimed in claim 1 wherein said activation includes heating said massive metal at 700°F.–1400°F. in the presence of air.

7. The method of preparing methane as claimed in claim 1 wherein said catalyst contains about 50%–95% nickel.

8. The method of preparing methane as claimed in claim 1 wherein said catalyst contains about 60%–90% nickel.

9. The method of preparing methane as claimed in claim 1 wherein said catalyst contains about 75% nickel.

10. The method of preparing methane as claimed in claim 1 wherein said catalyst contains about 76% nickel and about 15.8% chromium.

11. The method of preparing methane as claimed in claim 1 wherein said catalyst is inconel metal.

12. The method of preparing methane as claimed in claim 1 wherein said catalyst is in the form of wire.

13. The method of preparing methane as claimed in claim 1 wherein said catalyst is in the form of wire mesh.

14. The method of preparing methane as claimed in claim 1 wherein said charge hydrocarbon is a paraffinic hydrocarbon charge.

15. The method of preparing methane as claimed in claim 1 wherein said temperature is 900°F.–1100°F.

16. The method of preparing methane as claimed in claim 1 wherein said temperature is about 1100°F.

17. The method of preparing methane as claimed in claim 1 wherein said pressure is 300–700 psig.

18. The method of preparing methane as claimed in claim 1 wherein the mole ratio of steam to hydrocarbon is 5–15:1.

19. The method of preparing methane as claimed in claim 1 wherein the mole ratio of steam to hydrocarbon is about 10:1.

20. The method of preparing methane which comprises passing a mixture f 5–20 moles of steam and one mole of non-aromatic hydrocarbon into contact with an activated catalyst consisting essentially of inconel metal wire mesh which has been activated by heating in the presence of an oxygen-containing gas at 700°F.–1400°F.;

maintaining said mixture of steam and non-aromatic hydrocarbon at about 700°F.–1100°F. and 300–800 psig during said contact with catalyst thereby forming a product gas containing methane; and recovering said product gas containing methane.

* * * * *

UNITED STATES PATENT AND TRADEMARK OFFICE
CERTIFICATE OF CORRECTION

PATENT NO. : 3,957,682
DATED : May 18, 1976
INVENTOR(S) : Dorawala-Estes-Kerr

It is certified that error appears in the above-identified patent and that said Letters Patent are hereby corrected as shown below:

Col. 5, first table, last line, cancel "4" in the first column.

col. 5, second table, and col. 6, first table, last line of each cancel "g.$^4$", insert --g.--.

col. 6, second table, under Example XVII*, cancel "69.21", insert --69.2--;

col. 7, line 5, cancel "3.10% insert --31.0%--; line 18, cancel "in", insert --of--; line 18, after "28.1%", insert --methane--; line 27, correct the spelling of "undesirably";

claim 20, line 3, correct the spelling of "of".

Signed and Sealed this

Twenty-seventh Day of June 1978

[SEAL]

Attest:

RUTH C. MASON
Attesting Officer

DONALD W. BANNER
Commissioner of Patents and Trademarks